United States Patent [19]

Weise et al.

[11] Patent Number: 5,341,981
[45] Date of Patent: Aug. 30, 1994

[54] USE OF A CADMIUM-FREE SILVER ALLOY AS BRAZING SOLDER (III)

[75] Inventors: Wolfgang Weise, Frankfurt am Main; Alexander Voelcker, Rodenbach; Dieter Kaufmann, Birstein-Kirchbracht; Willi Malikowski, Aschaffenburg; Joerg Beuers, Gelnhausen; Harald Krappitz, Hanau, all of Fed. Rep. of Germany

[73] Assignee: Degussa Aktiengesellschaft, Frankfurt, Fed. Rep. of Germany

[21] Appl. No.: 114,615

[22] Filed: Sep. 1, 1993

[30] Foreign Application Priority Data

Sep. 2, 1992 [DE] Fed. Rep. of Germany ....... 4229189
May 7, 1993 [DE] Fed. Rep. of Germany ....... 4315188

[51] Int. Cl.$^5$ .............................. B23K 35/30
[52] U.S. Cl. ................... 228/262.9; 420/502; 420/587; 428/673
[58] Field of Search ........... 228/262.9, 262.71, 626.42, 228/262.43; 420/502, 504, 587; 428/673

[56] References Cited

U.S. PATENT DOCUMENTS 3,892,564 7/1975 Hatswell et al. .................. 428/587

FOREIGN PATENT DOCUMENTS 0173806 6/1987 European Pat. Off. .
1234397 2/1967 Fed. Rep. of Germany .
2745409 4/1979 Fed. Rep. of Germany .
3315498 10/1984 Fed. Rep. of Germany .
 450673 11/1974 U.S.S.R. .

Primary Examiner—Kenneth J. Ramsey
Attorney, Agent, or Firm—Beveridge, DeGrandi, Weilacher & Young

[57] ABSTRACT

Cadmium-free brazing solders with working temperatures under 630° C. containing 45 to 80 wt. % silver, 5 to 13 wt. % copper, 10 to 25 wt. % gallium, 8 to 20 wt. % zinc, and 0 to 5 wt. % indium and/or tin.

12 Claims, No Drawings

USE OF A CADMIUM-FREE SILVER ALLOY AS BRAZING SOLDER (III)

BACKGROUND AND INTRODUCTION

The present invention relates to the use of cadmium-free silver alloys as brazing solders, in particular as general purpose brazing solders for use with fluxes in air.

Brazing solders are considered to be metal alloys suitable for brazing with working temperatures in excess of 450° C. They often consist of silver with added copper, zinc and cadmium. Currently, there are practically no usable general purpose brazing solders for use with fluxes, or under a vacuum or protective gas, which have a working temperature below 600° C. However, the lower the working temperature, the less the mechanical properties of the workpieces to be joined are impaired during the brazing operation by heating to this temperature and energy requirements are simultaneously reduced. It is therefore important to have available brazing solders which have the lowest possible working temperature.

Brazing solders with working temperatures between 600° and 700° C. mainly consist of alloys of the metals silver, copper, tin, zinc and cadmium. It is, however, known that cadmium and its highly volatile oxides may have toxic effects if they are absorbed by the human body. Such absorption cannot always be completely eliminated when brazing is performed incorrectly with solders containing cadmium, so that there may be a risk of poisoning. This gives rise to the requirement to greatly reduce the cadmium content of brazing solders or to keep brazing solder alloys free of cadmium.

In most previously used brazing solder alloys with a working temperature between 600° and 700° C., a moderate or high cadmium content is necessary to achieve these low temperatures. Previously known cadmium-free brazing solders have working temperatures which are 80° to 120° C. higher than for solders containing cadmium and is not tolerable for temperature sensitive materials. While brazing solder alloys of silver-copper-tin with high proportions of tin do have low working temperatures, they are, however, very brittle and cannot be made into shaped articles.

A cadmium-free brazing solder based on silver is known from DE-AS 24 17 060 and contains 40 to 50 wt. % silver, 15 to 38 wt. % copper, 22 to 32 wt. % zinc, 1 to 6 wt. % tin, and 0.5 to 3 wt. % indium. The working temperatures of these brazing solders are between 710° and 630° C., which is, however, still too high for various applications.

DE-OS 33 15 498 describes stratified contact pieces for low current contacts in which the solder layer consists of a silver-copper-gallium alloy. The alloy contains 60 to 75 wt. % silver, 18 to 35 wt. % copper, and 5 to 8 wt. % gallium, wherein the latter component may also be replaced with 4 to 7 wt. % gallium plus 1 to 4 wt. % indium, or with 1 to 4 wt. % gallium and 3 to 7 wt. % tin. Melting points for these solders are not stated; they are, however, above 650° C.

Solders with 50 to 65 wt. % silver, 5 to 41 wt. % copper, 3 to 12 wt. % gallium, and 6 to 18 wt. % indium are known from Soviet patent SU 450 673 (Derwent Abstract 75-65066W7/39). Their melting point is from 640° to 680° C.

DE-OS 27 45 409 describes brazing solder alloys with 50 to 70 wt. % silver, 15 to 30 wt. % copper, 8 to 20 wt. % zinc, and 0.1 to 8 wt. % gallium and/or indium. Their melting point is between 650° and 680° C.

The melting points of these alloys may be still further reduced by raising the gallium content. However, silver-copper alloys with more than 8 wt. % gallium are difficult to work and may no longer be made into semi-finished articles.

SUMMARY OF THE INVENTION

An object of the present invention was therefore to provide cadmium-free brazing solder alloys based on silver which have the lowest possible working temperature below 630° C., which may be readily formed, and which may be used for general purpose applications.

This object and others are achieved according to the present invention by the use of silver alloys with 45 to 80 wt. % silver, 5 to 13 wt. % copper, 10 to 25 wt. % gallium, 8 to 20 wt. % zinc, and 0 to 5 wt. % indium and/or tin.

Preferably, alloys made from 62 to 72 wt. % silver, 5 to 13 wt. % copper, 12 to 24 wt. % gallium, and 9 to 18 wt. % zinc are used. Alloys made from 65 to 70 wt. % silver, 6 to 12 wt. % copper, 15 to 22 wt. % gallium, and 9 to 16 wt. % zinc have proved particularly successful. Indium and/or tin may be added to these alloys to further decrease the working temperature and to improve wetting characteristics.

DETAILED DESCRIPTION OF THE INVENTION

Surprisingly, the alloys of the present invention have working temperatures between and 580° and 620° C. They exhibit very good wetting on various metal substrates, such as copper, nickel, brass, iron-nickel alloys or steel, both under protective gas and after use of fluxes in air. The alloys are surprisingly ductile and readily shapeable, so that the most varied shaped solder articles may be produced from them.

It has surprisingly been found that the processability of silver-copper-gallium alloys with gallium contents of over 10 wt. % may be substantially improved if zinc is added to the alloy in quantities of 8 to 20 wt. % and the copper content is simultaneously restricted to an upper limit of 13 wt. %.

The following table contains, by way of example, the composition and working temperatures of several solder alloys according to the present invention:

| Solder number | Alloy composition in wt. % | | | | Working temp. (°C.) |
| --- | --- | --- | --- | --- | --- |
| | Ag | Cu | Ga | Zn | |
| 1 | 64 | 12 | 12 | 12 | 620 |
| 2 | 64 | 10 | 10 | 16 | 620 |
| 3 | 65 | 10 | 15 | 10 | 600 |
| 4 | 62 | 10 | 18 | 10 | 590 |

The solders of this invention are used in the same way as conventional solders. Conventional fluxes can be used. A wide variety of metal articles can be soldered or brazed in this way.

Further variations and modifications of the invention will become apparent to those skilled in the art from the foregoing and are intended to be encompassed by the claims appended hereto.

German Priority Applications P 42 29 189.5, filed on Sep. 2, 1992, and P 43 15 188.4, filed on May 7, 1993, are relied on and incorporated by reference.

What is claimed:

1. A cadmium-free silver alloy brazing solder comprising 45 to 80 wt. % silver, 5 to 13 wt. % copper, 10 to 25 wt. % gallium, and 8 to 20 wt. % zinc.

2. The solder according to claim 1, which additionally comprises 0 to 5 wt. % indium and/or tin.

3. The solder according to claim 1, comprising 62 to 72 wt. % silver, 5 to 13 wt. % copper, 12 to 24 wt. % gallium, and 9 to 18 wt. % zinc.

4. The solder according to claim 3, comprising 65 to 70 wt. % silver, 6 to 12 wt. % copper, 15 to 22 wt. % gallium, and 9 to 16 wt. % zinc.

5. A method of using the solder composition of claim 1 as a solder, comprising applying said composition to a metal substrate and soldering in the presence of a flux.

6. A method of using the solder composition of claim 2 as a solder, comprising applying said composition to a metal substrate and soldering in the presence of a flux.

7. A method of using the solder composition of claim 3 as a solder, comprising applying said composition to a metal substrate and soldering in the presence of a flux.

8. A method of using the solder composition of claim 4 as a solder, comprising applying said composition to a metal substrate and soldering in the presence of a flux.

9. A metal article brazed with the solder according to claim 1.

10. A metal article brazed with the solder according to claim 2.

11. A metal article brazed with the solder according to claim 3.

12. A metal article brazed with the solder according to claim 4.

* * * * *